United States Patent
Ratinen et al.

(10) Patent No.: US 8,668,811 B2
(45) Date of Patent: Mar. 11, 2014

(54) METHOD AND APPARATUS FOR PRODUCING A PYROLYSIS LIQUID

(71) Applicants: Metso Power Oy, Tampere (FI); Teknologian Tutkimuskeskus VTT, VTT (FI)

(72) Inventors: Sampo Ratinen, VTT (FI); Jani Lehto, Tampere (FI); Mikko Anttila, Tampere (FI); Tuomo Hilli, Tampere (FI); Kristin Onarheim, Nokia (FI); Ismo Hirvonen, Tampere (FI); Yrjo Solantausta, VTT (FI); Markku Raiko, Hyvinkaa (FI)

(73) Assignee: Metso Power Oy, VTT (FI)

( * ) Notice: Subject to any disclaimer, the term of this patent is extended or adjusted under 35 U.S.C. 154(b) by 0 days.

(21) Appl. No.: 13/774,979

(22) Filed: Feb. 22, 2013

(65) Prior Publication Data

US 2013/0219773 A1    Aug. 29, 2013

(30) Foreign Application Priority Data

Feb. 24, 2012 (FI) .................................... 20125210

(51) Int. Cl.
  *C10B 49/02* (2006.01)
  *C10B 53/02* (2006.01)
(52) U.S. Cl.
  USPC ............... 201/36; 201/43; 202/208; 202/215; 202/260; 202/270; 585/240; 585/242; 44/605; 44/606
(58) Field of Classification Search
  USPC .......... 201/36, 37, 41, 43; 202/208, 260, 270; 585/240, 242; 44/605, 606
  See application file for complete search history.

(56) References Cited

U.S. PATENT DOCUMENTS

| 4,223,140 A * | 9/1980 | Hirdler et al. ................. 544/192 |
| 4,554,055 A | 11/1985 | Rooney |
| 5,458,862 A * | 10/1995 | Glawion .................... 423/245.3 |
| 8,394,179 B2 * | 3/2013 | Smith et al. ..................... 95/219 |
| 2010/0115841 A1 * | 5/2010 | Cork ............................. 48/209 |

FOREIGN PATENT DOCUMENTS

DE           3602555 A1    7/1987

OTHER PUBLICATIONS

A.V. Bridgwater, G.V.C. Peacocke, Fast Pyrolysis Processes for Biomass, Mar. 2000, Renewable and Sustainable Energy Reviews, vol. 4, Issue 1, pp. 1-73.*
Finnish Patent Office, English Translation of Finnish Office Action dated Jan. 16, 2013 received in foreign priority application FI-20125210.
Finnish Patent Office, English Translation of Finnish Search Report dated Jan. 16, 2013 received in foreign priority application FI-20125210.
Solantausta et al., "Bio-oil Production from Biomass: steps toward Demonstration", Energy & Fuels, vol. 26, No. 1, Jan. 19, 2012, pp. 233-240.
European Patent Office, European Application No. 13156492.4 Search Report dated Jun. 13, 2013, pp. 1-7.

* cited by examiner

*Primary Examiner* — Nina Bhat
*Assistant Examiner* — Jonathan Miller
(74) *Attorney, Agent, or Firm* — Moore & Van Allen PLLC

(57) ABSTRACT

Disclosed herein is an apparatus and a method for producing a pyrolysis liquid, wherein the pyrolysis liquid is formed by means of pyrolysis from a raw material by forming, and a pyrolysis reactor, a gaseous pyrolysis product by pyrolysis and condensing it in a condenser into a pyrolysis liquid, and feeding circulation gas into the pyrolysis reactor. The circulation gas is conducted by a liquid ring compressor into the pyrolysis reactor and purified before being conducted into the pyrolysis reactor, and the pyrolysis liquid is used as the liquid layer in the liquid ring compressor.

16 Claims, 1 Drawing Sheet

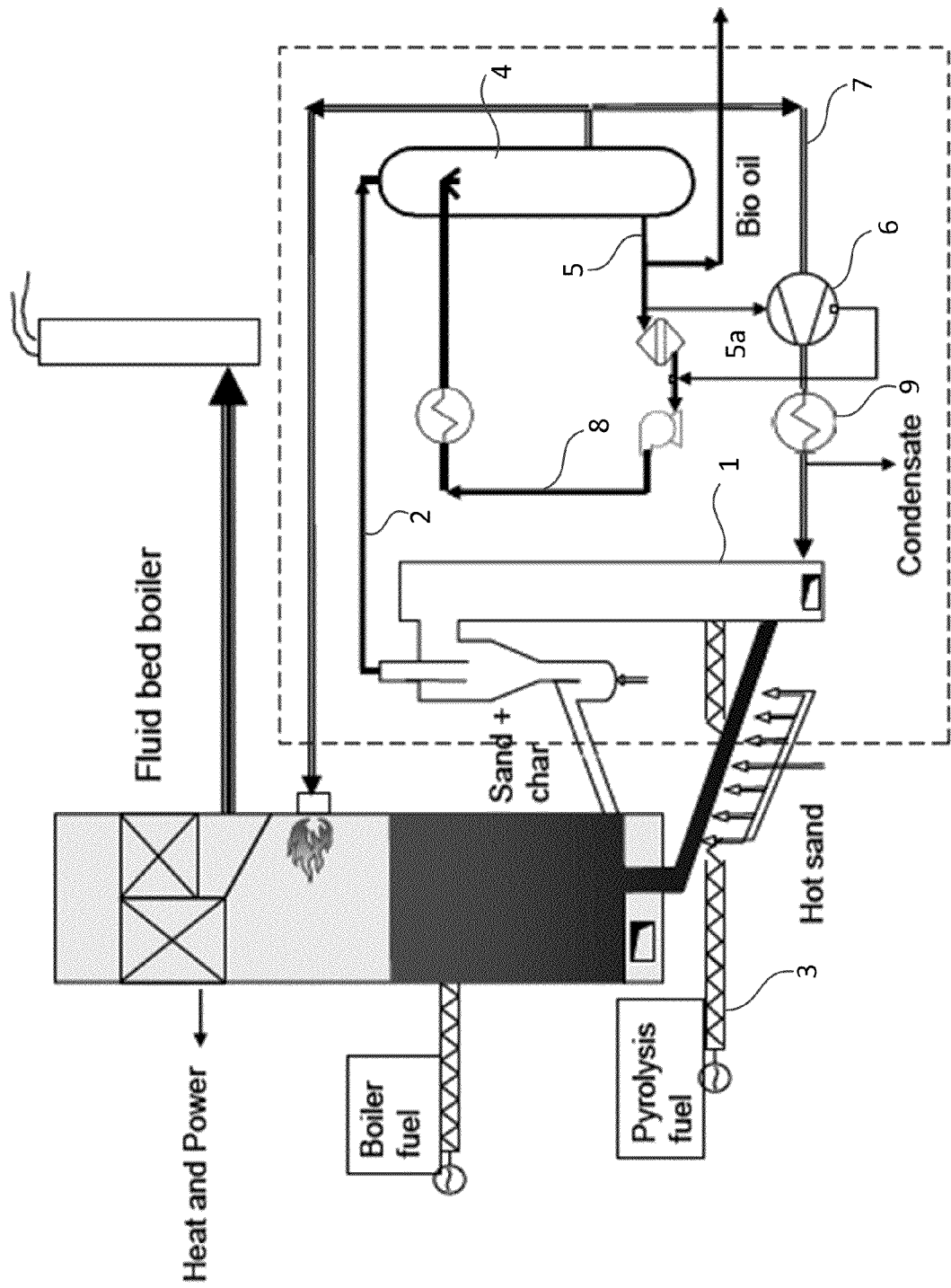

METHOD AND APPARATUS FOR PRODUCING A PYROLYSIS LIQUID

CROSS-REFERENCE TO RELATED APPLICATIONS

This application claims the benefit of priority under 35 U.S.C. §119 to Finnish Patent Application No. 20125210, filed on Feb. 24, 2102, the content is hereby incorporated by reference herein in its entirety.

FIELD OF THE INVENTION

The invention relates to a method for producing a pyrolysis liquid and to an apparatus for producing a pyrolysis liquid.

BACKGROUND OF THE INVENTION

Known from the prior art is the production of pyrolysis liquid fuel by means of pyrolysis from different raw materials. In addition, the so-called fast pyrolysis is known.

The problem in producing a pyrolysis liquid is that the moisture in pyrolysis liquid fuel, particularly one produced from logging residue or other bio-based raw material, is often high, which reduces the heat value of the product and also raises the production costs per thermal unit. The moisture in a pyrolysis liquid can be reduced by drying the raw material, which is not always cost-effective. Another problem in the produced pyrolysis product, in addition to moisture, is impurities which it contains. A further problem in the production of a pyrolysis liquid is that a compressor is used to circulate gas in the pyrolysis process, such compressor requiring a very pure gas in order to operate.

OBJECTIVE OF THE INVENTION

The objective of the invention is to disclose a new type of method and apparatus for producing a pyrolysis liquid. Another objective of the invention is to improve the quality of the circulation gas circulated in connection with pyrolysis.

SUMMARY OF THE INVENTION

The invention is based on a method for producing a pyrolysis liquid, wherein the pyrolysis liquid is formed by pyrolysis from a raw material by forming, in a pyrolysis reactor, which may be a fluidized-bed reactor, a gaseous pyrolysis product. The gaseous pyrolysis product is condensed in a condenser into a pyrolysis liquid, and circulation gas is fed into the pyrolysis reactor. The circulation of the circulation gas is conventionally provided by a compressor of the like. According to the invention, the circulation gas is conducted by a liquid ring compressor into the pyrolysis reactor and purified before being conducted into the pyrolysis reactor, and the pyrolysis liquid is used as the liquid layer in the liquid ring compressor.

In addition, the invention is based on an apparatus for producing a pyrolysis liquid, which apparatus includes at least one pyrolysis reactor which may be a fluidized-bed reactor. In the pyrolysis reactor, a gaseous pyrolysis product is formed by pyrolysis from a raw material. In addition, the apparatus includes raw material feeding means for feeding the raw material into the pyrolysis reactor and a condenser, wherein the gaseous pyrolysis product is condensed in a pyrolysis liquid, and gas feeding means for feeding circulation gas into the pyrolysis reactor and circulation gas circulating means for circulating the circulation gas into the pyrolysis reactor from the condenser. According to the invention, the apparatus includes a liquid ring compressor for conducting circulation gas into the pyrolysis reactor from the condenser and simultaneously purifying the circulation gas, and the apparatus includes compressor liquid circulating means for conducting the pyrolysis liquid used as the liquid layer in the liquid ring compressor from the condenser to the liquid ring compressor and from the liquid ring compressor back to the condenser.

Specifically, the invention is based on improving the quality of the circulation gas and thus also on improving the quality of the pyrolysis liquid. The improvement of quality according to the invention is provided by purifying the circulation gas. According to the invention, a conventional compressor is replaced by the liquid ring compressor, wherein specifically the pyrolysis liquid is used as the working liquid, whereupon the circulation gas can be purified while being circulated. Another advantage in using the liquid ring compressor is that the circulation gas need not be pure when entering the compressor; instead, the gas is purified when forced to flow through the liquid layer of the liquid ring compressor.

In connection with this invention, any kind of known liquid ring compressor can be used. In the liquid ring compressor, gas is brought into contact with the liquid of the liquid layer.

In one embodiment of the invention, the circulation gas is purified by being arranged to flow through the liquid layer of the liquid ring compressor. In a preferred embodiment, the liquid ring compressor can also be used at least partially to cool the circulation gas.

The circulation gas often includes aerosol-type components as impurities, which disturb the reliability of devices included in the circulation gas system, e.g. by clogging up the devices, and may transfer into the pyrolysis product. In one embodiment, the circulation gas is purified by removing specifically the aerosol-type components by the liquid ring compressor. The method and apparatus according to the invention also allow removal of other impurities from circulation gas.

Preferably, the pyrolysis liquid already condensed in the apparatus is used as the liquid layer in the liquid ring compressor by circulating at least a part thereof through the liquid ring compressor as the liquid layer of the compressor. In a preferred embodiment, the pyrolysis liquid used as the liquid layer is circulated from the condenser to the liquid ring compressor and from the liquid ring compressor back to the condenser. In one embodiment, the pyrolysis liquid used as the liquid layer is conducted to a scrubber circulation and therethrough back to the condenser. Preferably, the pyrolysis liquid used as the liquid layer is purified, e.g. by stripping, before being conducted back to the condenser. In one embodiment, the pyrolysis liquid to be circulated is cooled before being conducted back into the condenser.

In one embodiment, any kind of pyrolysis liquid suitable for the purpose of use can be used as the liquid layer of the liquid ring compressor.

In one embodiment of the invention, the circulation gas is cooled before being conducted into the pyrolysis reactor, and liquid, preferably water, condensed during the cooling is removed from the circulation gas. This way, the water content of the pyrolysis liquid produced can be reduced because the moisture in the circulation gas in the pyrolysis reactor is lower. Cooling can be provided in many different ways, e.g. by means of a heat exchanger or a similar cooling device. In one embodiment, the cooling is carried out at least partially in the liquid ring compressor. In one embodiment, the cooling is provided by the liquid ring compressor to provide sufficient cooling as required by the application. The water condensed in the cooling can be removed by manners known per se.

In one embodiment of the invention, the apparatus includes at least one first cooling device for cooling the circulation gas after the liquid ring compressor and before conducting the circulation gas into the pyrolysis reactor. Reliability of the cooling device is provided for by purifying the circulation gas by means of the liquid ring compressor. The circulation gas is cooled by means of the cooling device, preferably so as to make the circulation gas condense, in which case the water can be removed from the circulation gas. The cooling device used may be a heat exchanger, condenser or other cooling device suitable for the purpose of use.

In one embodiment of the invention, the apparatus includes compressor liquid circulating means for conducting the pyrolysis liquid used as the liquid layer of the liquid ring compressor from the condenser to the liquid ring compressor and from the liquid ring compressor back to the condenser.

In one embodiment of the invention, the apparatus includes at least one second cooling device for cooling the circulated pyrolysis liquid before conducting it back into the condenser.

In the method and apparatus according to the invention, any suitable raw material can be used in the pyrolysis reactor, e.g. bio-based raw material, such as logging residue, peat, other suitable biomass and different mixtures thereof.

The invention provides purified circulation gas for use in a pyrolysis process. In particular, the invention permits the removal of aerosol-type components from the circulation gas. By virtue of the invention, the reliability of the pyrolysis apparatus can be improved for continuous production of the pyrolysis liquid. For example, the clogging risk in devices of the circulation gas system in the apparatus is reduced as the circulation gas can be purified. In addition, by virtue of the invention, there is no need for separate devices to purify the circulation gas, whereupon the number of devices and thus the device costs are reduced.

The invention provides an industrially easily and economically applicable method and apparatus for many different pyrolysis applications.

LISTING OF THE FIGURE

The FIGURE illustrates one apparatus according to the invention.

DETAILED DESCRIPTION OF THE INVENTION

In the following, the invention will be described by detailed examples of its embodiments with reference to the accompanying FIGURE.

Example 1

The apparatus includes a pyrolysis reactor (1), a fluidized-bed reactor in this embodiment. In the pyrolysis reactor, a gaseous pyrolysis product (2) is formed by pyrolysis from a raw material based on logging residue. The logging residue raw material is fed by means of raw material feeding means (3) into the pyrolysis reactor. Further, the apparatus includes a condenser (4), wherein the gaseous pyrolysis product (2) is condensed into a pyrolysis liquid (5, 5a).

In addition, the apparatus includes a liquid ring compressor (6) for conducting circulation gas (7) into the pyrolysis reactor (1) from the condenser (4) and purifying the circulation gas at the same time, e.g. from aerosol-type components or other impurities. Further, the apparatus includes gas feeding means (not shown in the FIGURE) for feeding the purified circulation gas (7) into the pyrolysis reactor (1). The condensed pyrolysis liquid (5a) is used as the liquid layer in the liquid ring compressor (6) and fed from the condenser (4) to the liquid ring compressor (6). From the liquid ring compressor (6), the pyrolysis liquid (5a) is returned into a scrubber circulation (8) and back to the condenser (4) or to the recovery of the pyrolysis liquid. In the scrubber circulation (8), impurities are removed from the pyrolysis liquid, such as aerosol-type components or other impurities. In connection with the scrubber circulation, the pyrolysis liquid is cooled by means of a cooling device before being conducted into the condenser. The scrubber circulation used may be any kind of system known per se including any accompanying devices.

In addition, the apparatus includes a heat exchanger (9) used as a cooling device for cooling the circulation gas before it is conducted into the pyrolysis reactor (1), so that the moisture content of the circulation gas can be simultaneously reduced.

It was unexpectedly found in the conducted test runs that the pyrolysis liquid works particularly well as the liquid layer of the liquid ring compressor because e.g. the aerosol-type components could be well adhered to the pyrolysis liquid.

The method and apparatus according to the invention are applicable as different embodiments for use in the most different pyrolysis applications.

The invention is not limited merely to the examples referred to above; instead, many variations are possible within the scope of the inventive idea defined by the claims.

The invention claimed is:

1. A method for producing a pyrolysis liquid, the method comprising:
    forming, from a raw material, a gaseous pyrolysis product by pyrolysis in a pyrolysis reactor;
    condensing the gaseous pyrolysis product into a pyrolysis liquid in a condenser;
    introducing circulation gas into the pyrolysis reactor using a liquid ring compressor, and using the pyrolysis liquid as a liquid layer in the liquid ring compressor; and
    purifying the circulation gas prior to introduction to the pyrolysis reactor.

2. The method according to claim 1, wherein the circulation gas is purified by arranging it to flow through the liquid layer of the liquid ring compressor.

3. The method according to claim 1, further comprising recirculating the pyrolysis liquid used as the liquid layer from the condenser to the liquid ring compressor and from the liquid ring compressor back to the condenser so as to provide a circulated pyrolysis liquid.

4. The method according to claim 1, wherein the pyrolysis liquid is cooled before being conducted back into the condenser.

5. The method according to claim 2, wherein the circulated pyrolysis liquid is cooled before being conducted back into the condenser.

6. The method according to claim 2, wherein the circulation gas is cooled before being conducted into the pyrolysis reactor and the pyrolysis liquid condensed during the cooling is removed from the circulation gas.

7. The method according to claim 2, wherein the circulation gas is cooled before being conducted into the pyrolysis reactor and the pyrol liquid condensed during the cooling is removed from the circulation gas.

8. The method according to claim 3, wherein the circulation gas is cooled before being conducted into the pyrolysis reactor and the pyrolysis liquid condensed during the cooling is removed from the circulation gas.

9. The method according to claim 1, wherein aerosols are removed from the circulation gas.

10. The method according to claim 2, wherein aerosols are removed from the circulation gas.

11. The method according to claim 3, wherein aerosols are removed from the circulation gas.

12. The method according to claim 6, wherein aerosols are removed from the circulation gas.

13. An apparatus for producing a pyrolysis liquid, the apparatus comprising a pyrolysis reactor;

raw material feeding means configured for introducing the raw material into the pyrolysis reactor;

a condenser configured to condense a gaseous pyrolysis product into a pyrolysis liquid;

gas feeding means configured for feeding circulation gas into the pyrolysis reactor;

circulation gas circulating means configured for circulating the circulation gas from the condenser into the pyrolysis reactor;

a liquid ring compressor configured for conducting the circulation gas into the pyrolysis reactor and purifying circulation gas, the liquid ring compressor further configured to utilize, as a liquid layer, the pyrolysis liquid; and compressor liquid circulating means configured for conducting the pyrolysis liquid, used as the liquid layer of the liquid ring compressor, to the liquid ring compressor from the condenser, and back to the condenser from the liquid ring compressor.

14. The apparatus according to claim 13, wherein the apparatus comprises at least one first cooling device for cooling the circulation gas before it is conducted into the pyrolysis reactor.

15. The apparatus according to claim 13, wherein the apparatus comprises at least one second cooling device for cooling the circulated pyrolysis liquid before it is conducted back into the condenser.

16. The apparatus according to claim 15, wherein the apparatus further comprises at least one second cooling device for cooling the circulated pyrolysis liquid before it is conducted back into the condenser.

\* \* \* \* \*

UNITED STATES PATENT AND TRADEMARK OFFICE
CERTIFICATE OF CORRECTION

PATENT NO.        : 8,668,811 B2
APPLICATION NO.   : 13/774979
DATED             : March 11, 2014
INVENTOR(S)       : Sampo Ratinen et al.

It is certified that error appears in the above-identified patent and that said Letters Patent is hereby corrected as shown below:

In the Claims

Column 4, Line 62, Claim 7: "pyrol" should be changed to --pryolysis--

Signed and Sealed this
Third Day of June, 2014

Michelle K. Lee
*Deputy Director of the United States Patent and Trademark Office*

UNITED STATES PATENT AND TRADEMARK OFFICE
CERTIFICATE OF CORRECTION

Page 1 of 1

PATENT NO. : 8,668,811 B2
APPLICATION NO. : 13/774979
DATED : March 11, 2014
INVENTOR(S) : Sampo Ratinen et al.

It is certified that error appears in the above-identified patent and that said Letters Patent is hereby corrected as shown below:

In the Claims:

Column 4, Line 56, Claim 6: "The method according to claim 2," should be changed to --The method according to claim 1--.

Column 4, Line 62, Claim 7: "pyrol" should be changed to --pyrolysis--.

Column 6, Line 17, Claim 16: "The apparatus according to claim 15," should be changed to --The apparatus according to claim 14--.

Signed and Sealed this
Ninth Day of September, 2014

Michelle K. Lee
*Deputy Director of the United States Patent and Trademark Office*